Sept. 26, 1961  C W. MUSSER  3,001,840
ELLIPTICAL BEARING
Original Filed Dec. 10, 1958  4 Sheets-Sheet 1
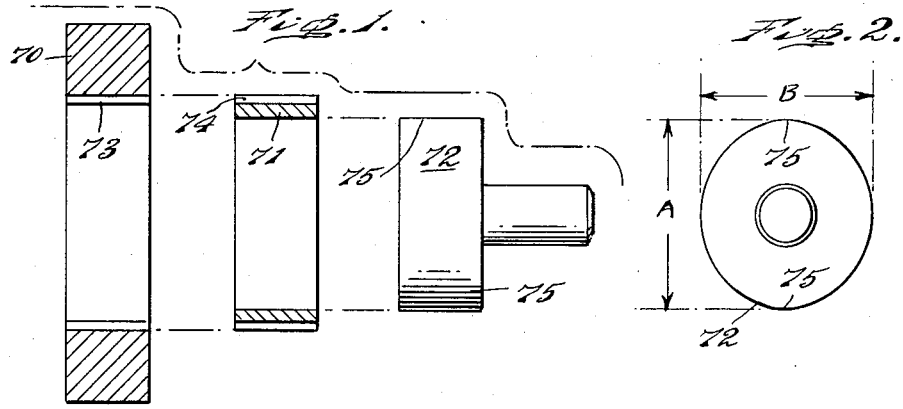
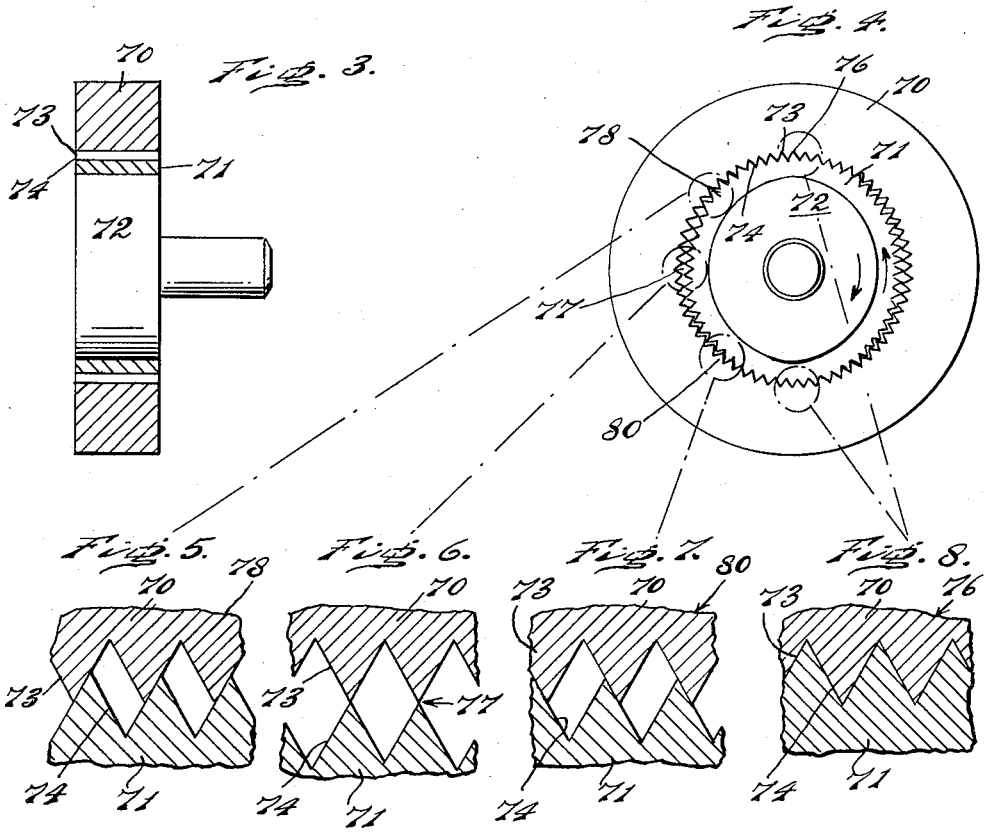
INVENTOR.
C Walton Musser
BY
ATTORNEYS.

Sept. 26, 1961        C W. MUSSER        3,001,840
ELLIPTICAL BEARING
Original Filed Dec. 10, 1958        4 Sheets-Sheet 2
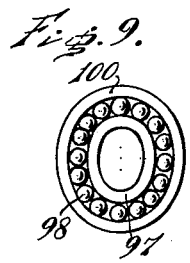
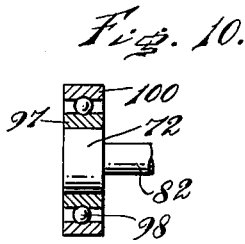
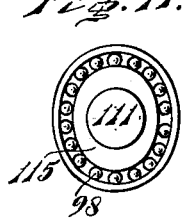
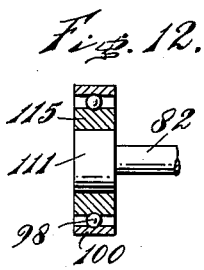
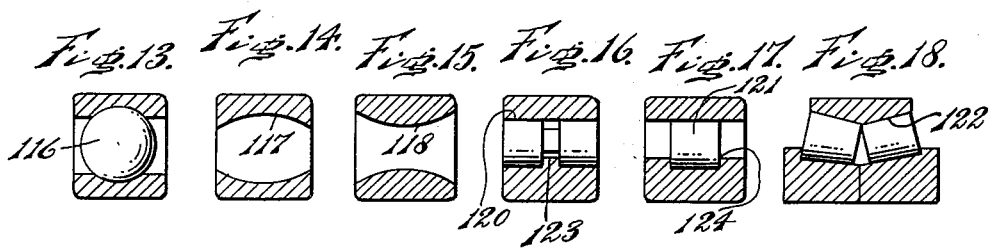

Sept. 26, 1961 C W. MUSSER 3,001,840
ELLIPTICAL BEARING

Original Filed Dec. 10, 1958 4 Sheets-Sheet 3

INVENTOR
C. WALTON MUSSER
BY
ATTORNEYS

Sept. 26, 1961 C W. MUSSER 3,001,840
ELLIPTICAL BEARING
Original Filed Dec. 10, 1958 4 Sheets-Sheet 4

INVENTOR
C. WALTON MUSSER
BY
ATTORNEYS

United States Patent Office 3,001,840
Patented Sept. 26, 1961

3,001,840
ELLIPTICAL BEARING
C Walton Musser, Beverly, Mass., assignor to United Shoe Machinery Corporation, Flemington, N.J., a corporation of New Jersey
Original application Dec. 10, 1958, Ser. No. 779,454, now Patent No. 2,983,162, dated May 9, 1961. Divided and this application May 16, 1960, Ser. No. 29,475
3 Claims. (Cl. 308—193)

The present invention relates to elliptical antifriction bearings, especially ball and roller bearings.

The present application is a division of my application Serial No. 779,454, filed December 10, 1958, for Strain Wave Gearing-Spring Preloading, now Patent No. 2,983,162, granted May 9, 1961, which is in turn a continuation-in-part of my patent application, Serial No. 495,479, filed March 21, 1955, for Strain Wave Gearing, now United States Patent No. 2,906,143, granted September 29, 1959, which is incorporated herein by reference. The reader is referred to said patent for explanation of basic features of the subject matter.

A purpose of the invention is to propagate a strain wave such as a sine wave by means of an antifriction bearing whose races as engaged by the bearing elements are of elliptical shape.

A further purpose is to obtain extremely precise transmission of motion by means of an antifriction bearing having elliptical race surfaces.

A further purpose is to transmit motion with low wear by means of an elliptical bearing.

A further purpose is to employ an elliptical bearing to balance the force components applied to a rotating system.

A further purpose is to generate a sinusoidal wave in a mechanical motion.

A further purpose is to obtain a high efficiency in gearing.

A further purpose is to produce a gearing system with very few parts.

A further purpose is to secure ease in lubrication in gearing.

A further purpose is to produce gearing of very light weight and of simple manufacture.

A further purpose is to obtain quiet operation of gearing.

A further purpose is to provide coaxial input and output.

A further purpose is to avoid difficulty with problems of center distance or misalignment.

Further purposes appear in the specification and in the claims.

In the drawings I have chosen to illustrate a few only of the numerous embodiments in which my invention may appear, selecting the forms shown from the standpoints of convenience in illustration, satisfactory operation, and clear demonstration of the principles involved.

FIGURE 1 is an exploded axial section of a device for transmitting motion according to the present invention, in a simplified form.

FIGURE 2 is a right end elevation of the strain inducer shown in FIGURE 1.

FIGURE 3 is an axial section corresponding generally to the exploded section of FIGURE 1, but showing the parts assembled in their normal operating relationship.

FIGURE 4 is a right end elevation of the assembly of FIGURE 3.

FIGURES 5 to 8 inclusive are enlarged developed fragmentary sections transverse to the axis showing the relative relations of the teeth at various positions in FIGURE 4, as indicated by the corresponding section lines.

FIGURES 9 and 10 illustrate an elliptical bearing of the invention used as a mechanical strain inducer, FIGURE 9 showing an end elevation and FIGURE 10 showing an axial section.

FIGURES 11 and 12 show in end elevation and axial section respectively, a two lobe ball bearing strain inducer having an elliptical inner race and an elliptical outer race.

FIGURES 13 to 18 inclusive respectively illustrate in fragmentary axial section various contours of races or balls as the case may be, for antifriction bearing elements to be used in strain inducers.

Figure 19:
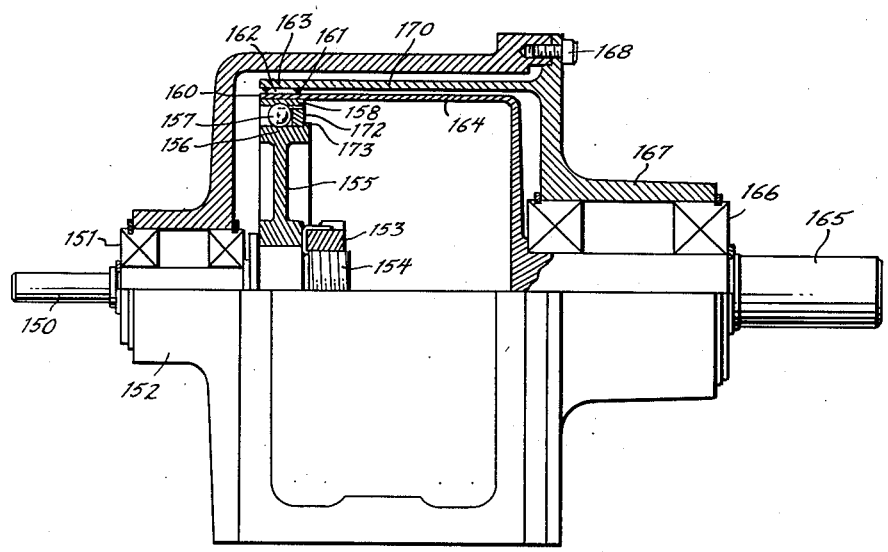

FIGURE 19 is a side elevation, partly in axial section, showing an elliptical ball bearing and related parts according to the invention.

Figure 20:
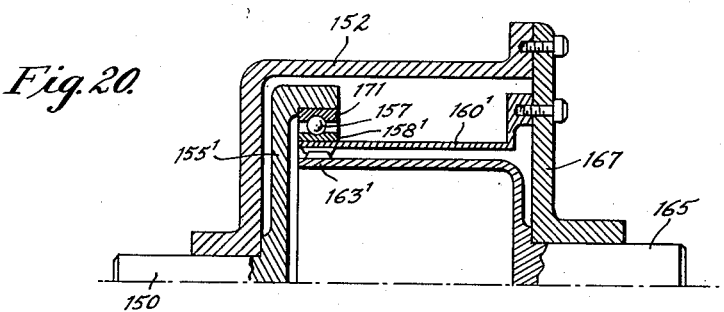

FIGURE 20 is a half axial section of a modification of the device of FIGURE 19.

Figure 21:
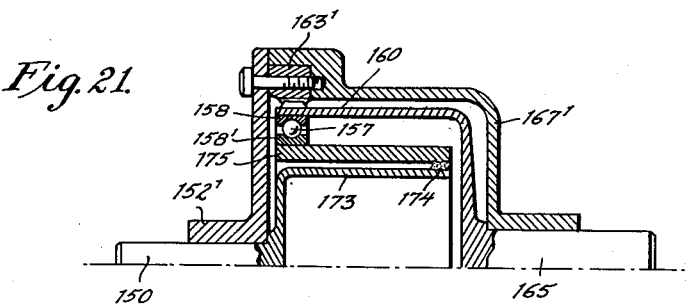

FIGURE 21 is a half axial section of a still further modification of the device of the invention.

PRINCIPLES OF OPERATION

Strain wave gearing is a novel system for transmitting motion and power, in which the gear tooth engagement is induced at a plurality of points by the deflection of a thin ring gear or the like. The tooth engagement at a plurality of points around the circumference is propagated along the periphery of the thin ring gear as the crest of the induced deflection wave is made to move around this periphery. As the deflection moves around the gear, each tooth moves radially in and out of engagement as it progresses from one tooth to the next, tracing during this motion a curve which is generally of the character of a sinusoidal wave, giving rise to the term "strain wave gearing."

In the simplest form as shown for example in FIGURES 1 to 8 inclusive, the motion transmitting device consists of a ring gear 70, a strain gear 71, and a strain inducer 72. The ring gear has internal teeth 73 in the illustration shown which are preferably of axially extending character. In this form the strain gear 71 has external teeth 74 which also preferably extend axially and at the same diametral pitch as the teeth on the ring gear but have a slightly smaller pitch diameter. This difference in pitch diameter is caused by the fact that the number of teeth in this case on the strain gear is less than the number of teeth on the ring gear. The difference in the number of teeth between the two gears, or the tooth differential, should be equal to or a multiple of the number of places at which the strain gear is deflected to cause tooth engagement with the ring gear. This differential would desirably be two, using a strain inducer having an elliptical contour with two lobes 75, as shown in FIGURES 1 and 2. As already explained, the strain gear 71 is made of a material which is elastic under the conditions of operation, and in the case of a steel strain gear, is made of relatively thin cross section so that it can be deflected easily in a radial direction.

The form of strain inducer for transmitting motion as illustrated in FIGURES 1 to 8 is a very simple one having two points of strain engagement of the strain gear. The strain inducer 72 has an elliptical contour, as already explained, whose major axis A is larger than the inside diameter of the strain gear 71 by an amount approximately equal to the difference in pitch diameter of the ring gear and the strain gear. The minor axis B is smaller than the inside diameter of the strain gear by approximately the same amount. When the strain inducer is inserted into a position inside the strain gear, as shown in FIGURE 3, it causes the strain gear to be distorted into elliptical form, with the pitch line of the teeth at the major axis equal to the pitch diameter of the ring gear as shown at 76 in FIGURES 4 and 8. At the position as shown in FIGURE 8 the pitch circles of the two gears are coincident. At the minor axis the pitch line of the strain gear teeth is smaller than the pitch diameter of the ring gear, and if a full tooth height is used, the teeth will just clear one another as shown at 77 in FIGURES 4 and 6. At intermediate points 78 and 80 as shown in FIGURES 4, 5 and 7, the teeth will have varying degrees of engagement. This condition prevails where the tooth differential is equal to the number of lobes on the strain inducer which in this case is two.

DISTINCTIVE FEATURES

The radically different principles upon which the operation of strain wave gearing depends produces parameters differing considerably from those normal for conventional gearing. These differences are outlined and discussed in the following paragraphs.

Many of these features are interrelated and consequently in the discussion of one feature others may be involved.

Adjustable freedom from backlash

Tooth interengagement in strain wave gearing is the result of the radial deflection of the relatively thin ring strain gear. Engagement is on both sides of the crest of this deflection with the tooth contact area on the strain gear on the side of the tooth toward the crest of the wave. Directly at the crest of the wave, and for approximately 10 percent of the tooth pitch on each side, the teeth are in mesh but not in contact. By making the strain inducer capable of adjusting the deflection, a gear system with backlash can have it removed by increasing the deflection to the point where the crest of the wave is radially deflected further into the mating tooth spaces until the teeth at each side come into contact.

As in standard gearing which has its center distance changed, this partially destroys the theoretical tooth relationship. However, in strain wave gearing this does not appear to have a marked deleterious effect as the angle change from the theoretical parallel mating surfaces is minute. Since the strain gear is a relatively thin gear, by increasing the deflection the crest can be made to "spring load" the contacting piece by changing or skewing the shape of the strain wave. A slight amount of this is desirable to eliminate all backlash and to preload the piece to assure freedom from backlash after high spots on the teeth have been worn away. Increasing the deflection beyond a moderate spring load, however, is not recommended due to the added stresses imposed on the strain gear at the crest of the wave.

It has been experimentally ascertained that a gear system can be easily made free from all backlash without a marked increase in input torque. This was checked on a gear made to the approximate dimensions of the gear described in connection with the calculation of the mechanical efficiency of the system by Formula 17 of the patent aforesaid, except that the number of lobes was three instead of two. An eight foot long boom was attached to the output shaft and backlash was measured at the end of this boom by a 0.001 inch dial indicator. No backlash was discernible under this test.

Precise transmission of motion

The gear ratio relationship between the input and output is always determined by approximately 50 percent of the teeth, half of those opposing the other half. Consequently, the position of the output relative to the input at any one instant is not determined by one or two teeth which may, due to faulty manufacture or wear, be improperly spaced or formed. Also these teeth are distributed at several points ($2n$) around the circumference and hence slight eccentricities do not affect the input-output relationship. The use of small teeth also tends to increase the actual number of teeth in active engagement. This precise transmission of motion is inherent in correctly made strain wave gears and consequently a large number of the distinctive differences play a contributing role. The major ones are discussed in reference to adjustable freedom from backlash, large percentage of teeth in contact, uniformly distributed wear, balanced forces, torque developing forces at point of greatest leverage, surface contact, torsional rigidity of output, no "center-distance" problem, insensitive to misalignment and differential motion, insensitive to eccentricity and tooth shape.

Uniformly distributed wear

Each revolution of the input brings every tooth on each gear into active contact with mating teeth on the other gear several times. This effectively prevents differential wear particularly in reciprocating use such as on hand operated controls or instruments. The large percentage of teeth in contact at all times also tends to distribute the wear over all the teeth. Incorrectly positioned or proportioned teeth will receive a disproportionate amount of wear tending to correct these teeth. Subsequent wear will be uniformly spread over all of the teeth.

Balanced forces

Since all of the forces necessary to produce torque are distributed at the pitch lines of both gears at a number of equal points equal to the number of lobes on the strain inducer, they tend to balance out and become equal. This effectively prevents any radial forces being inserted on the output shaft bearing as these tend to be self-centering. The same condition prevails on the input since the strain inducer also exerts its radial forces at a number of places equally spaced. All of the active forces within the strain wave gearing system are balanced so that they tend to produce only the desired result—the transmission of torque.

Sinusoidal tooth motion

The shape of the strain wave is similar to a sine wave. This effectively eliminates all shock as the teeth gradually decelerate to zero radial velocity after passing the tooth contact area. They then accelerate in the opposite direction up to the point of tooth engagement. During tooth engagement they are moving essentially at constant velocity. This action is similar for both ends of the radial tooth travel.

No load on bearings

All of the forces within strain wave gearing are counterbalanced as discussed above in reference to balanced forces. Consequently a strain wave gearing system can be made to operate without bearings on either the input or the output. The forces all tend to be self-centering. Several models of strain wave gearing applied to motors have used this centering tendency as the motor bearing for one end of the armature. Therefore the bearings that are used on a strain wave gearing system are only to enclose the mechanism and withstand forces applied from the outside.

Few parts

As a torque transmission unit that does not have any exterior lateral forces applied to it, the entire unit can be made from three parts, a ring gear, a strain gear and a strain inducer. To use this torque will probably require a few additional parts. An actual strain gear unit has been built into a fractional horsepower motor with only seven (7) parts added to the motor; a ring gear, a strain gear, an inner ring, three one-half inch balls and an output shaft.

Ease of lubrication

Low velocity and short travel are probably the two greatest contributors to simplifying the lubrication problem. Also, the teeth move radially in and out tending to distribute throughout the entire gear surface by capillary action any lubricant that is present. Since the travel of the tooth on the active profile is only a short distance before it moves to another active profile, there is no replenishing problem—the tooth does not slide far enough to force out all of the lubrication. In addition, the lubrication material that is at the head of the tooth as it is moving into place gets spread over the entire active profile.

Small size

As indicated above in regard to the large torque capabilities, a strain wave gear reducer has a large capacity for given size. As a consequence, a unit for the same capacity would be relatively very small in size. Calculations indicate that, excluding the question of thermal capacity, a strain wave gear reducer would be less than 10 percent in cubic size of that of a standard gear reducer of equivalent ratio and torque capacity.

Ease of manufacture

Teeth of the size and shape used in strain wave gearing can be broached from tubing in quantity production lots. Since the gears are essentially rings, there is no center hole to which the teeth can be eccentric. Also, as the strain gear is deflected in service, ellipticity or out-of-roundness has no serious effect. Slight variations in tooth contour or dimensions can be compensated for by altering the deflection upon adjustment of the strain inducer. The usual problem of center distance between the gears does not exist in this case, and the balanced forces in the system tend to keep the gears coaxial. In moderately loaded units, a molded neoprene or nylon strain gear can be used.

Light weight

Light weight is the result of few parts and small size.

Quiet operation

While quiet operation is most important and somewhat unique in the present invention, it is the result of adjustable freedom from backlash, precise transmission of motion, large percentage of teeth in contact, low pitch-line velocity, small tooth motion, balanced forces, low tooth sliding velocity, surface contact, sinusoidal tooth motion, and low tooth contact pressures.

Coaxial input-output

In this respect the strain wave gearing system is similar to epicyclic gearing but dissimilar to other types of gear reducers. However, due to its small size the strain wave gearing system is ideally suited for a reduction unit within and a part of an electric motor. It is also of great utility on scientific instrument control shafts where either the whole gear unit can be turned for fast control or the coaxial input for vernier or slow control.

Ratios from 10 to 1 to 1,000,000 to 1

Deflection and diameter are the determinants of gear ratios—the smaller the deflection is relative to the diameter, the higher the gear ratio. Where gear ratios lower than approximately 75 to 1 are desired, it is necessary to use a material that has a lower modulus of elasticity than steel to obtain the necessary deflection. Since strain wave gearing has surface contact, low tooth contact pressures, low shear stresses in teeth, and distributed stresses, nylon appears to be ideally suited for this purpose. For ratios from about 25 to 1 to 10 to 1 the proper grade of rubber or neoprene may be used to advantage.

Where it is desired to increase the ratio beyond approximately 200 to 1, a ball or roller strain inducer is used. The strain wave is generated by the individual balls or rollers which have a planetary reduction relationship to the sun inner raceway. In order to obtain the overall ratio, the ratio of the strain wave gear is multiplied by the planetary reduction relation of the planet rollers with the sun inner raceway. Ratios up to 1000 to 1 can easily be obtained by this method without any increase in complexity.

For ratios from 1000 to 1 to 1,000,000 to 1, dual strain wave gearing is used. With this there are three gears instead of the usual two; a stationary ring gear, a movable driven ring gear and a strain gear. The two ring gears are keyed together by the deflected strain gear. The operation of dual strain wave gearing is described below.

Ratio selection not limited

Usually in differential mechanisms where teeth are used, ratios frequently are in steps and the ratios in between these steps can only be obtained by compounding. The ratios of toothed strain wave gearing, also, must of necessity be in steps. However, these steps are considerably smaller and are without voids. For example, the ratio can be stated simply as the number of teeth in the driven gear divided by the number of lobes on the strain inducer. Then for a three lobe strain inducer, ratios can be made to change in steps of one third. When the planetary strain inducer is used, this can be further divided to obtain any gear ratio desirable.

No center distance problems

Strain wave gearing does not depend on the accurate location and alignment of shaft centers to obtain proper tooth engagement. Input is coaxial with the output and all forces are inherently balanced to automatically assure this coaxiality.

Intensitive to misalignment

Misalignment of the face of the strain gear in relation to the face of the ring gear is relatively unimportant due to the low tooth contact pressure and low shear stresses in the teeth.

Surface sliding one direction only

With rotation in one direction, the teeth on the strain gear always enter on one side of mating teeth and leave on the other side. This assists in lubrication and in keeping the surfaces free of foreign matter, thereby reducing the coefficient of friction to the lowest possible level.

Differential motion insensitive to eccentricity and tooth shape

A large change in tooth shape or contour produces the greatest effect on the percentage of teeth in contact. Even with such a shape, there are still many teeth in contact at several equally spaced points on the pitch circle. While this change has a deleterious effect on precise differential motion, the effect is small due to the size and number of teeth still in contact. As these teeth still have the tendency to center the input and output so as to make them coaxial, eccentricity of the gear pitch line with the bearing will tend to put a radial load on this bearing along the axis of the eccentricity. Unless this eccentricity is sufficiently large to interfere with tooth engagement, it should not affect the differential motion.

BASIC FORMS

In the preceding explanation of strain wave gearing, the strain wave gearing has been illustrated and described as an elliptical two lobe cam sliding directly on the strain gear. This simplified form facilitated explanation of the basic principles. However, there are many possible variations for the strain inducing element, each one having its own particular advantages.

By using a ball-bearing for the strain inducer, as illustrated, for example, in FIGURES 9 and 10, the coefficient of friction can be materially reduced with a resulting increase in efficiency. This construction shows an arbor 72 on a shaft 82, and the arbor is of the desired strain inducer form and engages the inside of inner bearing race 97 which receives bearing balls 98 in a suitable groove, the balls being held on the outside by an outer race 100 having a cooperating internal ball-engaging groove. Since the balls closely fit the races, by expanding the inner race to an elliptical shape, the outer race is expanded to a similar shape. Rotation of the inner race will then send a wave around the outer race. Careful measurements have shown that the wave form generated in this manner is identical with that generated by two lobed plain strain inducer. For best results, in order to insure correct wave generation, there should be at least 36 balls in the bearing. The outer race should be thin enough to prevent it from being stressed beyond the endurance limit, and the inner race must be able to withstand the initial expansion. Expanding the bearing causes the balls to have added clearance except at the crest of the wave. As the bearing is used to transmit torque, the load is shifted to the side of the wave, and, if heavy loads are to be handled, the inner race should be supported for at least 60° on each side of the crest to prevent it from deflecting under this load. If a bearing is used with a loading slot, this slot should be placed on the major axis of the inner race.

Where the same advantages as above are desired with a smaller gear ratio, the elliptic inner race bearing shown in FIGURES 11 and 12 can be used. The arbor 111 in this case will desirably be circular and the inner race 115 of the bearing has an elliptical exterior raceway, which conveniently receives antifriction elements such as balls 98 and distorts an exterior raceway 100 into an elliptical form. This has the same action as the form of FIGURES 9 and 10 and it does not require an expanding arbor. Here again a special bearing is used with the desired deflection built into the inner race which has an elliptical outside and a circular inside diameter.

If any of these strain inducers can be used in conjunction with and built into other equipment, the strain inducer can be used to replace one of the bearings necessary for such other equipment. For example, if it is built into an electric motor, the strain inducer can replace and become the bearing for one end of the armature.

In all of the illustrations of FIGURES 9 to 12 inclusive, the strain inducers have been shown with the preferred and most likely number of lobes. However, in each of these two or three lobes can be used as desired. A larger number of lobes can also be used but this in general is not recommended as there appear to be few special advantages to compensate for the corresponding complexity. Generally, two lobes are used except where self-centering is desired and in that case three lobes will ordinarily be employed.

In the above examples of the strain inducers, the antifriction elements have been shown generally as balls and ball-bearings. This has been done merely for convenience and is not intended to imply that ball-bearings will in every case be used nor even that ball-bearings are the preferred form. FIGURES 13 to 18 show a succession of different antifriction elements, each of which is suitable for strain wave gearing in connection with the strain inducer. Thus in FIGURE 13 I show a ball-bearing 116, while in FIGURE 14 I show a convex roller bearing 117, in FIGURE 15 a concave roller bearing 118, in FIGURE 16 an undercut roller bearing 120, in FIGURE 17 a cylindrical roller bearing 121 and in FIGURE 18 an opposed tapered roller bearing 122. Each of these forms has its own adherents and advantages and with proper application can be made to function satisfactorily. The basic advantage of rollers, in whatever form they may be used, is a greater load carrying capacity, or a longer life with the same load carrying capacity. In most instances the coefficient of friction is slightly greater due to the tendency of rollers to skew in service. Some rollers, notably the convex, concave and tapered, require a cage, as is well known, to control the extent of this skewing. The undercut roller does not require a cage as a central flange or ridge 123 in the race tends to align the rollers and correct skewing. The cylindrical roller is made with the side flanges fitting sufficiently close to the ends of the rollers at 124 to assure adequate guiding. All of these bearing forms appear to provide full support for the tooth portion of the strain gear. The undercut bearing with a full complement of rollers is particularly adapted for most applications as it has a large number of rollers, is self-aligning and has a high load capacity.

In FIGURE 19 I illustrate a speed changer according to the invention which has an input shaft 150 journalled at 151 in a housing portion 152 and carrying locked on the shaft by nut 153 engaged with threads 154, a wave generator or strain inducer 155 which is desirably the inner race of a ball-bearing, the exterior contour of the race as viewed from the end being elliptoidal at the surface 156 as later explained. The race 155 receives bearing balls 157 of uniform diameter which engage within an outer race 158 which is deflectable and is secured on the inside of a wave carrier or strain gear 160 having exterior teeth 161 meshing with interior teeth 162 on an external ring gear 163. The wave carrier 160 is connected by a deflectable wall 164 with output shaft 165 which is journalled in bearings 166 in a housing portion 167 which is connected to the housing portion 152 by bolts 168.

The ring gear though relatively rigid, is slightly deflectable and is anchored by an elongated sleeve portion 170 with the housing portion 167.

All of the components described may suitably be of steel, stainless steel or the like. The wave generator or strain inducer 155 in this case elliptoidally deflects the wave carrier or strain inducer 160 within the elastic limit, but by reason of the fact that the elliptoidality is excessive with respect to the space available for the wave carrier or strain gear 160, the ring gear 163 itself is deflected to make it slightly elliptoidal, thus assuring extra protection against backlash and extra firmness of locking, and wider area of tooth engagement between the ring gear and the strain gear.

In operation of the form of FIGURE 19, as the input shaft 150 turns, it turns the wave generator or strain inducer 155 and through the balls 157 and the race 158 (suitably of uniform diameter) it elastically deflects the wave carrier or strain gear 160 into engagement at the spaced points, with respect to the teeth on the ring gear 163 and further slightly elastically deflects the ring gear 163, broadening the zones of contact but leaving intermediate teeth out of contact. The motion of the input causes relative rotation of the output 165.

In FIGURE 19 the wave generator is internal and in FIGURE 20 there is a reversal, with the wave generator external but the components otherwise the same. Thus, in FIGURE 20, the wave generator or strain inducer 155' is externally acting on the outside of a deflectable ball-bearing race 171 of uniform thickness circumferentially, which engages the balls 157 of uniform diameter, which on the inside are retained in a race 158' which is deflectable and of uniform thickness around the circumference, and which bears on the outside of a wave carrier or strain gear 160' which has internal teeth meshing at spaced points around the circumference with external teeth on a ring gear 163', the ring gear being slightly deflected into an elliptoidal shape in end view by extra deflection imparted by the wave generator.

In the form of FIGURE 19 a bearing retainer 172 has been included resting against a flange 173 on the wave generator, but this feature is omitted in FIGURE 20.

In FIGURE 21 the input shaft 150 mounts a somewhat resilient cup 173 which is coaxial with the shaft and is secured as by welding at 174 to an elliptoidal wave generator or strain inducer 175 which extends from the annular weld 174 to a position adjoining the base of the cup 173, and an inner bearing race 158' of circumferentially uniform thickness is deflected into an elliptoidal shape by the wave generator 175 and engages the insides of uniform diameter ball-bearing balls 157 which are retained at the outside by a circumferentially uniformly thick race 158 which rests against the inside of wave carrier or strain gear 160 which has external teeth meshing at circumferentially spaced points with internal teeth on a rigid ring gear 163' which is held between parts 152' and 167' of the housing.

In this form the ring gear is so rigid that the tendency of the wave generator to deflect the wave carrier or strain gear beyond the distance permitted by the dimensions when the teeth on the wave carrier or strain gear engage the teeth on the ring gear, results instead in tooth deflection and slight elastic deflection of the wave generator 175.

It will accordingly be evident that by control of the relative stiffness the extent of additional pressure of engagement of the teeth at the points of engagement with intermediate areas of nonengagement can be controlled.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. An antifriction bearing comprising an inner race of elliptical contour, an outer race of elliptical contour surrounding and cooperating with an inner race, and antifriction bearing elements located between the inner race and outer race and running on the inner and outer races, one of said inner and outer races being radially deflectable.

2. An antifriction bearing comprising an inner race of elliptical contour, an outer race of elliptical contour surrounding and cooperating with the inner race, and bearing balls located between the inner and the outer race and running on the inner and outer races, one of said inner and outer races being radially deflectable.

3. An antifriction bearing comprising an inner race of elliptical contour, an outer race of elliptical contour surrounding and cooperating with the inner race, and bearing rollers located between the inner and outer races and running on the inner and outer races, one of said inner and outer races being radially deflectable.

References Cited in the file of this patent
UNITED STATES PATENTS

| | | |
|---|---|---|
| 1,978,707 | Gibbons | Oct. 30, 1934 |
| 2,943,894 | Brook | July 5, 1960 |